(12) United States Patent
DuHack et al.

(10) Patent No.: US 7,321,833 B2
(45) Date of Patent: Jan. 22, 2008

(54) FLUID FLOW RATE SENSOR

(75) Inventors: Michael DuHack, Indianapolis, IN (US); Bernd D. Zimmermann, Ashland, IN (US); Tung-Sheng Yang, Mansfield, OH (US)

(73) Assignee: Emerson Electric Co., St. Louis, MO (US)

( * ) Notice: Subject to any disclaimer, the term of this patent is extended or adjusted under 35 U.S.C. 154(b) by 29 days.

(21) Appl. No.: 11/485,562

(22) Filed: Jul. 11, 2006

(65) Prior Publication Data

US 2006/0265151 A1    Nov. 23, 2006

Related U.S. Application Data

(63) Continuation-in-part of application No. 10/963,750, filed on Oct. 13, 2004.

(51) Int. Cl.
*G01F 1/00* (2006.01)

(52) U.S. Cl. .................. 702/47; 702/45; 73/204.13

(58) Field of Classification Search .................. 782/45, 782/46, 47, 49
See application file for complete search history.

(56) References Cited

U.S. PATENT DOCUMENTS 4,501,145 A * 2/1985 Boegli et al. ............ 73/204.17
6,085,588 A * 7/2000 Khadkikar et al. ...... 73/204.27

* cited by examiner

*Primary Examiner*—John Barlow
*Assistant Examiner*—Stephen J. Cherry
(74) *Attorney, Agent, or Firm*—Harness, Dickey & Pierce, PLC

(57) ABSTRACT

A valve body defines an inlet, an outlet, a valving cavity disposed between the inlet and outlet and a valving surface between the inlet and the outlet. A valve is moveable to a position away from the valving surface for permitting flow from the inlet through the valving cavity to the outlet. The fluid flow rate sensor includes a probe having a detection module adapted to change condition in response to the presence of the flow of the fluid, a control module that is electrically connected to the probe that monitors the condition of the detection module over time (e.g., a temperature), determines a rate of change of that condition over time, and generates an output that is indicative of the rate of flow of the fluid, and a I/O module connected to the control module and communicating the output of the control module to another device or a user.

16 Claims, 12 Drawing Sheets

FLUID FLOW RATE SENSOR

CROSS-REFERENCE TO RELATED APPLICATIONS

This application is a continuation-in-part of U.S. patent application Ser. No. 10/963,750 filed on Oct. 13, 2004. The disclosure of the above application is incorporated herein by reference.

FIELD OF THE INVENTION

The present invention generally relates to a fluid flow rate sensor and more particularly to a fluid valve assembly having a fluid flow rate sensor.

BACKGROUND OF THE INVENTION

Fluid delivery systems have a wide variety of applications and are commonplace in many household appliances, such as metered water dispensers, icemakers, dishwashers, and clothes washers. In such systems, the volume of the fluid to be dispensed is typically controlled by a timing mechanism operable to open and then close a valve after predetermined period of time has elapsed.

These fluid delivery systems operate under the presumed condition that the fluid line pressure and, correspondingly, the fluid flow rate are known and static. All too often, however, the fluid delivery systems are susceptible to fluctuations in the fluid line pressure, and resultantly, the fluid flow rate varies. In such instances, when the fluid line pressure is lower than expected, an under-fill condition typically occurs. Conversely, when the fluid line pressure is greater than expected, an over-fill condition may result.

Consequently, it is desirable for fluid delivery systems to include an in-line sensor that monitors the fluid flow rate and enables the system to accordingly compensate the fluid delivery time.

Another desirable feature for a fluid flow sensor is the absence of any moving parts, such as a paddle-wheel or a turbine, for example. This is because there exists the probability that contaminants, debris or other small particle matter may be present in the fluid. Its function independent of moving parts, the fluid flow sensor is thereby more reliable under such operating conditions.

Thermo-anemometers are a type of flow rate sensor that does not require any moving parts to operate. Thermo-anemometers function based on the principles of heat transfer. Such flow rate sensors, though well-known, have traditionally lacked the necessary response times to make them suitable for many common applications, like water delivery systems for household appliances.

Traditional thermo-anemometers typically include two temperature sensors: one temperature sensor disposed at a downstream location in the fluid path for measuring the fluid temperature downstream; and another temperature sensor disposed at an upstream location in the fluid path for measuring the fluid temperature upstream. The sensor measuring the upstream temperature compensates for fluctuations in the water temperature that might bias the reading of the sensor measuring the downstream temperature. The thermo-anemometer subtracts the upstream temperature from the downstream temperature. By employing various known equations and thermal sensing principles, such as the Seebeck Effect, the temperature difference may be correlated to a fluid flow rate.

Other techniques for determining a fluid flow rate that are fundamentally based on thermodynamic principles are also known. For example, one method is to measure the heat loss, over time, of a known heat source that is exposed in the flow of the fluid. The heat loss, expressed as a temperature drop, can be correlated to a fluid flow rate. This method, however, can take a relatively long time period to provide usable results. The reason is primarily because it can take several seconds for the temperature of the source to reach steady-state after being exposed to the fluid flow. In some applications, however, such as in an icemaker, for example, this response time is much too slow.

FIG. 1, illustrates an exemplary graph of a typical response curve (temperature (T) vs. time (t)) of one such known system. When temperature (T) is plotted versus time (t), it is seen that the steady state value for temperature is not reached for about 1.5 to 2.0 seconds after the fluid flow is initiated. In the example illustrated, temperature was measured under water flow rate conditions of both 0.15 gallons per minute (GPM) and 0.75 GPM.

The need remains, therefore, for a valve having a fluid flow sensor that does not involve any moving parts, has a faster response time, and is easily integrated into a variety of fluid delivery systems.

SUMMARY OF THE INVENTION

In accordance with the present invention, an improved valve assembly including a fluid flow rate sensor and method of operation is provided. The invention comprises a valve having a thermo-anemometer-type fluid flow rate sensor design and a method for its operation that overcome the response time limitations of prior known fluid flow rate sensors.

In one aspect of the invention, a valve body defines an inlet, an outlet, a valving cavity disposed between the inlet and outlet and a valving surface between the inlet and the outlet. A valve is moveable to a position away from the valving surface for permitting flow from the inlet through the valving cavity to the outlet. The fluid flow rate sensor comprises a probe having a detection module adapted to change condition in response to the presence of the flow of the fluid, a control module that is electrically connected to the probe that monitors the condition of the detection module over time (e.g., a temperature), determines a rate of change of that condition over time, and generates an output that is indicative of the rate of flow of the fluid, and a I/O module connected to the control module and communicating the output of the control module to another device or a user.

In another aspect of the invention, a detection circuit includes a plurality of thermistors and a plurality of resistors, the detection circuit may be adapted to provide a voltage that varies in response to a change in temperature of the thermistors. A heating circuit comprises at least one resistor in thermal communication with at least one thermistor.

As a thermo-anemometer-type sensor, the fluid flow rate sensor of the invention does not incorporate any moving parts. The design of the sensor of the invention and its method for operation results in the sensor having a faster response time than prior known fluid flow rate sensors making it suitable for many sensing applications not before available to thermo-anemometer-type fluid flow rate sensors. The fluid flow rate sensor of the invention may be easily integrated into a variety of fluid delivery systems.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

The present invention provides an improved valve assembly having a fluid flow rate sensor and associated method for operation improving the valid detection response time of the sensor and being capable of easy integration into a variety of fluid delivery or monitoring systems.

Figure 1:
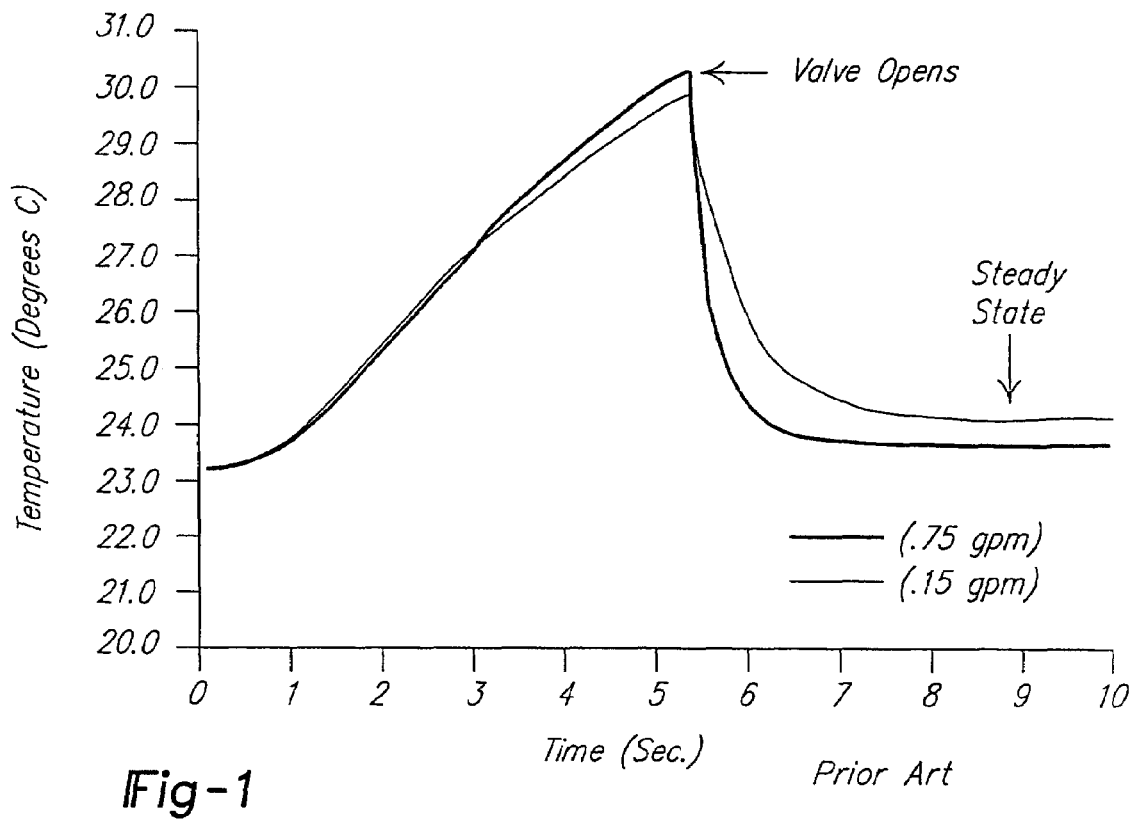
FIG. 1 is an exemplary graph plotting the temperature response over time for one prior art fluid flow rate sensor at two separate water flow rates.
Figure 2:
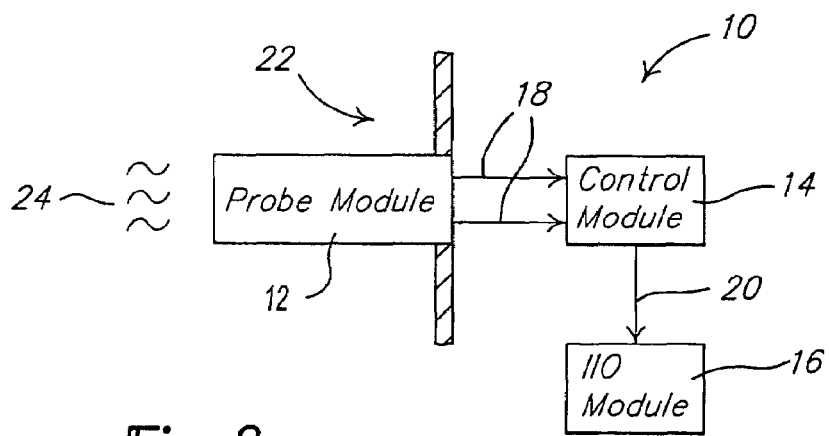
FIG. 2 is a schematic block diagram of a fluid flow rate sensor according to the invention.
Figure 3:
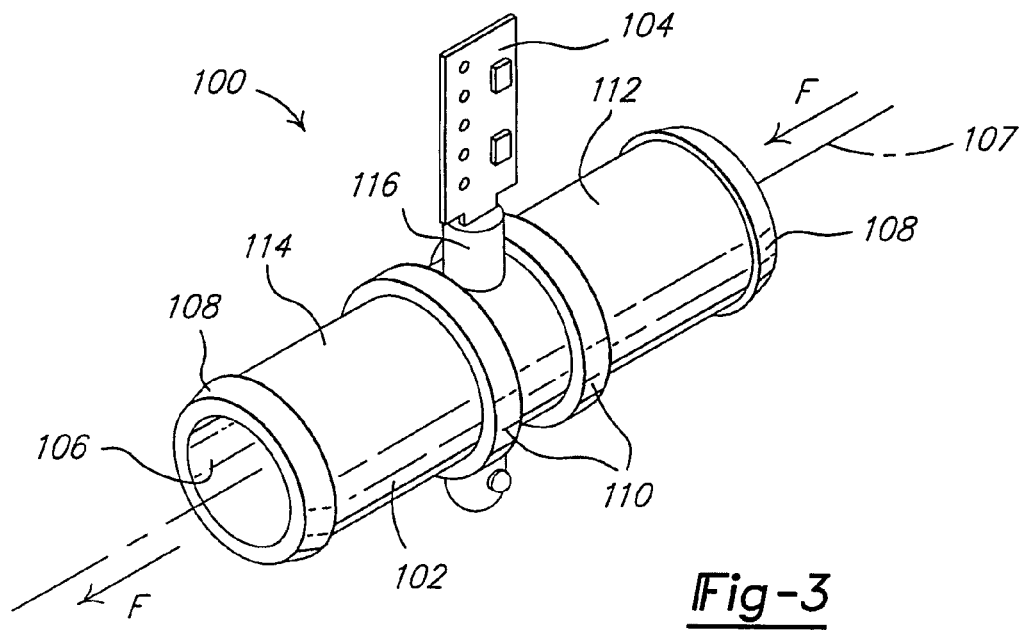
FIG. 3 is a perspective view of one embodiment of a probe for use with the fluid flow rate sensor of the invention.

FIG. 2 generally depicts the major components of the fluid flow rate sensor 10 of the invention. The sensor 10 generally includes a probe 12 coupled with a control module 14. An I/O module 16 may also be included in the sensor 10. As used in this description, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

The probe 12 is of the thermo-anemometer-type and has no moving parts. The probe 12 is typically disposed in a fluid environment 22 for detecting the flow rate of a fluid 24. When it is subjected to flow of the fluid 24, the probe 12 experiences changes in its condition represented by a signal 18 (e.g., a voltage).

The signal 18 from the probe 12 is continuously monitored by the control module 14. The control module 14 processes the signal 18 according to the method of the invention, and generates an output 20 that is indicative of a fluid flow rate. The I/O module 16 provides a means by which the sensor 10 can communicate its output 20 to other device(s) or a user.

It is presently contemplated that the fluid flow rate sensor 10 may be employed in a household appliance, such as a refrigerator, to monitor water flow in a water dispenser or automatic ice maker.

One embodiment of a probe 100 for use in the sensor 10 of the invention is shown in FIGS. 3-6. The probe 100 generally comprises a body 102 and a detection module 104.

The body 102, as shown, is a generally a cylindrically-shaped tubular member having a passageway 106 extending through its entire length along a longitudinal axis 107. Fluid 24 is able flow through the passageway 106 of the body 102 in a direction along the longitudinal axis 107. Annular flanges 108, 110 may be located at opposite ends 112, 114 of the body 102 to facilitate connection of the probe 100 to a fluid source, such as the flexible supply hose of a water dispenser, for example.

Located intermediate the ends 112, 114 of the body 102 is a housing 116. The housing 116 extends through the body 102 in a direction generally perpendicular to the longitudinal axis 107. The housing 116 is disposed within the passageway 106. The shape of the housing 116 is designed to promote laminar flow of the fluid flow moving through the passageway 106 and across the surface of the housing 116. The detection module 104 is received within the housing 116 such that the housing 116 encapsulates a portion of the detection module 104 to protect it from physical contact with the fluid environment. The housing 116, however, is capable of conducting thermal energy from the fluid environment to the detection module 104.

Both the body 102 and the housing 116 are preferably manufactured from thermally conductive polymers, such as, for example, polypropelene, polyvinylchloride, polyacetylene, polyparaphenylene, polypyrrole, and polyaniline. Ceramic and/or glass fillers mixed in with these base polymers have been shown to greatly enhance the material's thermal conductivity. One such material is known under the trade designation Konduit MT-210-14 and is available from GE/LNP.

Figure 6:
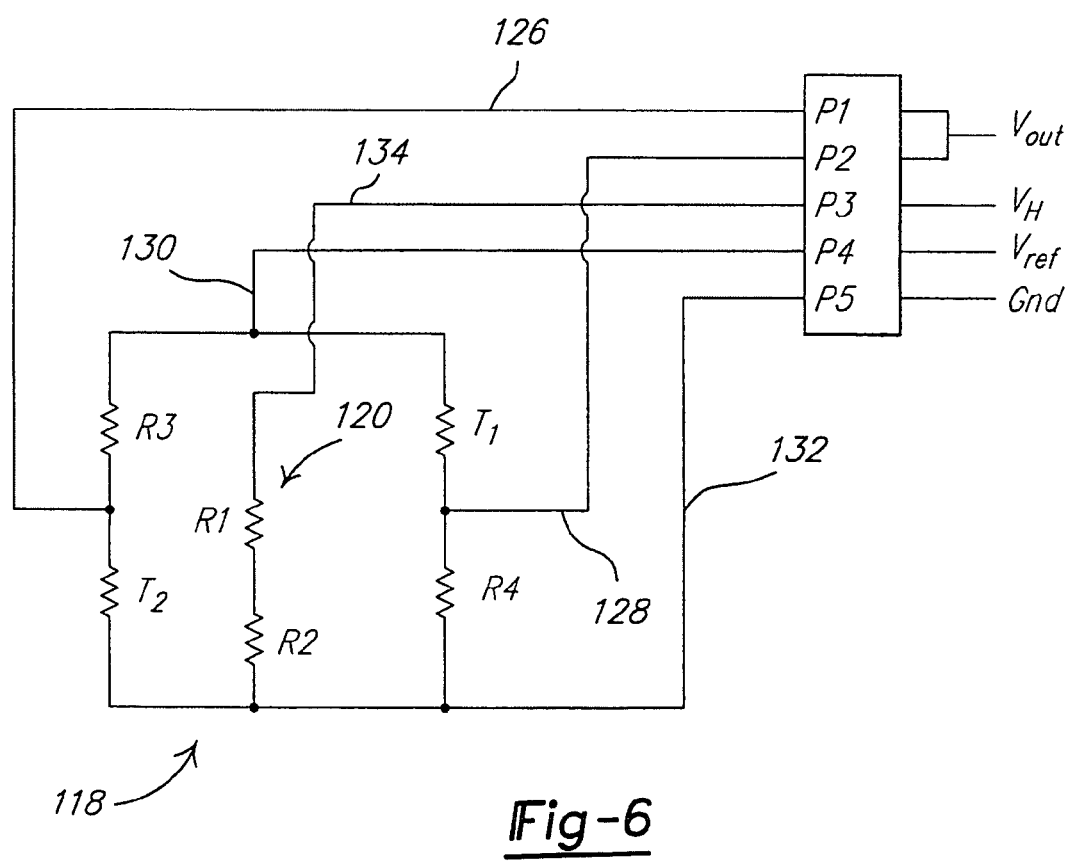
FIG. 6 is a schematic diagram of one embodiment of a detection circuit for use with the probe of FIG. 3.

The detection module 104 is shown in FIG. 6 as comprising a detection circuit 118 and a heating circuit 120. The detection module 104 is preferably highly thermally conductive and has a low thermal mass. The detection circuit 118 and a heating circuit 120 are deposited on a thermally conductive, glass-epoxy printed circuit board (PCB) substrate 124.

An exemplary detection circuit 118 comprises a pair of negative temperature coefficient (NTC) thermistors $T_1$, $T_2$ and a pair of resistors $R_3$, $R_4$ that together form a four-wire bridge circuit. Referring to FIG. 6, thermistor $T_1$ is coupled in series with resistor $R_4$ to form one leg of the bridge and thermistor $T_2$ is coupled in series with resistor $R_3$ to form the other leg of the bridge. Together, thermistor $T_1$ and resistor $R_4$ are coupled in parallel with thermistor $T_2$ and resistor $R_3$.

As shown, the detection circuit 118 includes traces 126, 128, 130, 132 that lead to a plurality of pin connectors $P_1$, $P_2$, $P_4$, $P_5$ located on the PCB substrate 124. Trace 130 terminates at pin $P_4$, where a reference voltage $V_{ref}$ is applied to the detection circuit 118. Traces 126, 128 are respectively coupled to opposite legs of the detection circuit 118 and terminate at pins $P_1$, $P_2$. An output voltage $V_{out}$, which can be calibrated to represent the temperature (T) of the thermistors $T_1$, $T_2$ as is well-known in the art, can be read at pins $P_1$, $P_2$. Trace 132 terminates at pin $P_5$ which is connected to ground.

It can be appreciated that having two thermistors in the detection circuit 118 of the invention accordingly increases the sensitivity of the circuit, thereby eliminating the need for additional signal conditioning to obtain the voltage output $V_{out}$.

The heating circuit 120 of the detection module 104 comprises a pair of heating resistors $R_1$, $R_2$. Trace 134 of the heating circuit 120 terminates at pin $P_3$. A voltage $V_H$ to power the heating circuit 120 is applied at pin $P_3$. The heating circuit 120 is electrically insulated from the detection circuit 118, but not thermally insulated. The heating resistors $R_1$, $R_2$ are located on the PCB substrate proximate to thermistors $T_1$, $T_2$, respectively, such that heat energy from the heating resistors $R_1$, $R_2$ is conducted to the thermistors $T_1$, $T_2$. The heating resistors are contemplated to provide as much as 4 to 6 watts.

It should be appreciated that the number of thermistors and heating resistors may vary depending on the application for the fluid flow rate sensor. For example, resistors $R_3$ and $R_4$ of the detection circuit 118 could be replaced with thermistors. Also, the heating resistors may be electrically in series or in parallel, or only a single heating resistor need be provided. Furthermore, heating resistor(s) and the(ir) corresponding voltage source may be omitted altogether in applications where the thermistor(s) can be internally self-heated.

Figure 4:
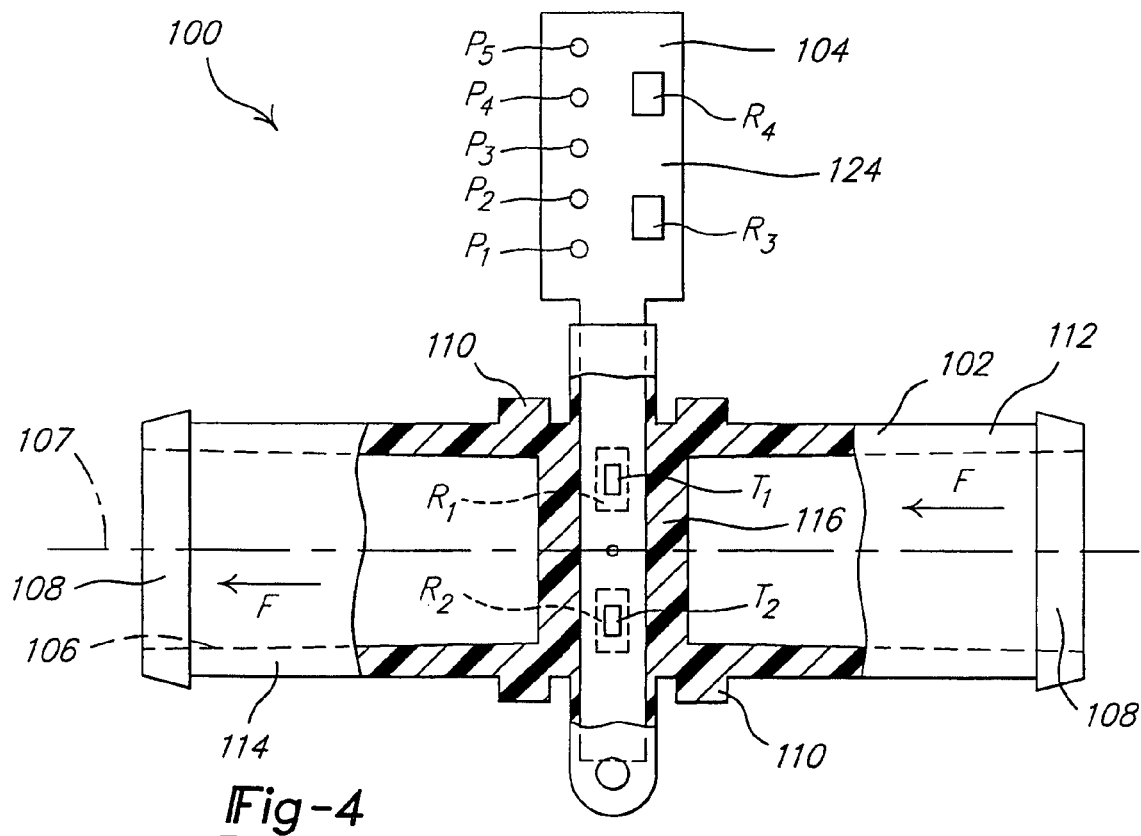
FIG. 4 is a front view of the probe of FIG. 3.

The detection module 104 is generally received within the housing 116 such that it is perpendicular to the direction of fluid flow F through the passageway 106. Referring to FIG. 4, one portion of the detection module's 104 PCB substrate 124 is located within the housing 116 such that it lies within the passageway 106 of the body 102. Another portion of the PCB substrate 124 extends beyond the housing 116 above the passageway 106 and still another portion of the PCB substrate 124 extends below the passageway 106.

Figure 5:
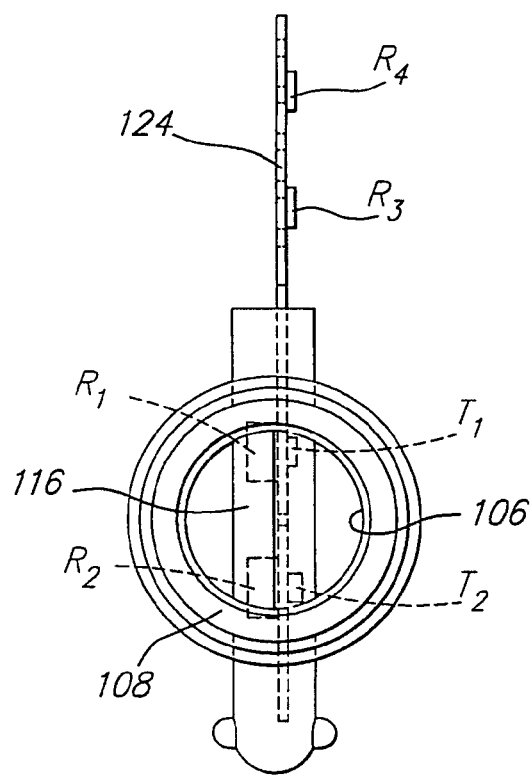
FIG. 5 is an end view of the probe of FIG. 3.

The detection circuit 118 and heating circuit 120 are arranged such that the thermistors $T_1$, $T_2$ and heating resistors $R_1$, $R_2$ lie on the portion of the PCB substrate 124 that is within the passageway 106 of the body 102. Resistors $R_3$, $R_4$ of the detection circuit 118 and all of the pin connectors $P_1$, $P_2$, $P_3$, $P_4$, $P_5$ lie on a portion of the PCB substrate 124 that extends outside of the housing 116, as best seen in FIGS. 4 and 5. Although all of the pin connectors $P_1$, $P_2$, $P_3$, $P_4$, $P_5$ are shown to be located on one side of the body 102, it is understood that the pin connector configuration could be modified, as desired, to relocate some or all of the pin connectors to the opposite side of the body 102.

Operation of the sensor 10 will now be described. The probe 100 for a fluid flow rate sensor 10 is coupled to the control module 14. Specifically, the control module 14 measures and analyzes $V_{out}$ from the probe 100 and correlates it to the flow rate of the fluid being measured by the sensor 10 to produce an output 20. An I/O module 16 may be coupled to the control module 14 to provide an interface for communicating the output 20 to other device(s) or a user.

Figure 7:
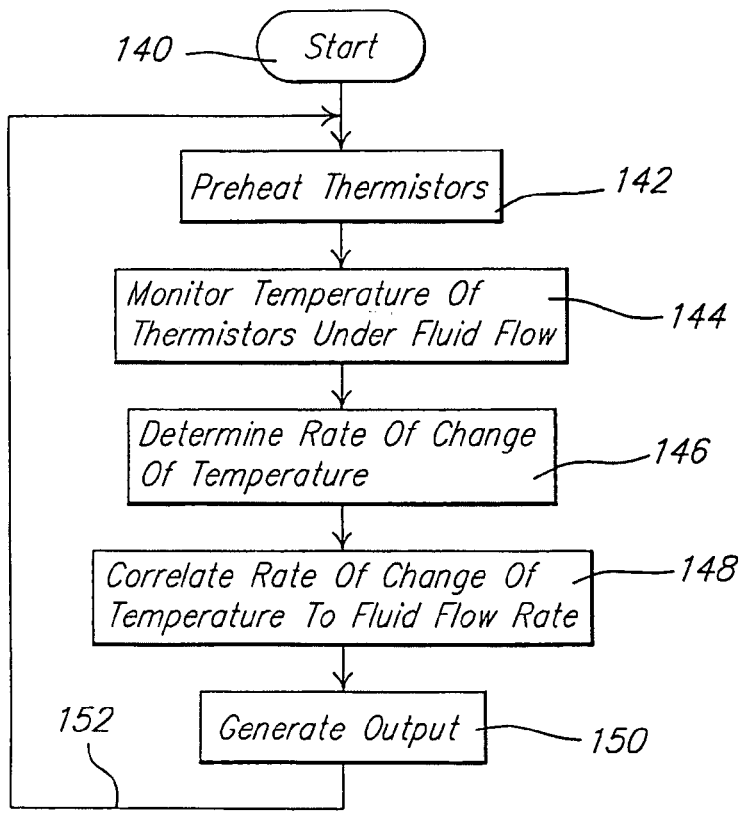
FIG. 7 is a flow chart describing the operation of the fluid flow rate sensor of the invention.

FIG. 7 shows a flowchart generally describing the operation of the fluid flow rate sensor 10 including a probe 100. The process starts at 140, with the fluid whose flow rate is to be measured being static, i.e., a fluid valve is closed and the fluid is not flowing through the passageway 106 of the probe 100.

Next, the thermistors $T_1$ and $T_2$ are preheated at 142. In this step, $V_H$ is applied to the heating circuit 120 by the control module 14, thereby energizing the heating resistors $R_{1a}$, $R_{2a}$ and causing the temperature of the thermistors $T_1$ and $T_2$ to increase from their initial starting temperature ($T_0$). The reference voltage $V_{ref}$ is applied to the detection circuit 118.

The output voltage $V_{out}$ of the detection circuit 118 is sampled at discrete time intervals (e.g., 25 msec). The temperature ($T_i$) of the thermistors $T_1$ and $T_2$ is determined from the output voltage $V_{out}$ in a well-known manner and as described below. This process is repeated until a predetermined temperature change threshold for the thermistors $T_1$ and $T_2$ has been reached (e.g., $T_i - T_0 > 25°$ C.). The value of $V_{out}$ is then stored and operation continues. $V_H$ may be held constant, reduced (as described further herein), or removed, depending on the sensor application.

Fluid flow is initiated, e.g., a fluid valve is opened and the fluid flows through the passageway 106 of the probe 100 and passes over and around the housing 116 and, consequently, the portion of the detection module 104 that is enclosed within the housing 116. As the fluid flows past the housing 116, heat is transferred from the thermistors $T_1$ and $T_2$ through the housing 116 and to the fluid. Correspondingly, both the temperature (T) of the thermistors $T_1$ and $T_2$ and the output voltage $V_{out}$ change over time (t).

At 144, the temperature (T) of the thermistors $T_1$ and $T_2$ is monitored. The output voltage $V_{out}$ from the detection circuit 118 is again sampled by the control module 14 at discrete time intervals (e.g., 100 msec). Again the temperature ($T_j$) of the thermistors $T_1$ and $T_2$ is determined from the output voltage $V_{out}$ in a well-known manner.

At 146, the control module 14 determines the rate of change of temperature ($T_j$) over time (i.e., it calculates $dT_j/dt$) as is well-known in the art. This process is repeated for a predetermined number of iterations (e.g., 10). At 148, the smallest value of $dT_j/dt$ is then correlated to a fluid flow rate. The control module 14 generates a corresponding output 20 at 150.

The I/O module 16 then is able to make the output 20 of the control module 14 available to, for example, a fluid flow controller (not shown) that determines how long a valve should be left open based upon the fluid flow rate that has been sensed by the sensor 10.

It should be understood that the sensor 10 can continue to operate even while fluid flow continues, to sequentially update the output 20. This is particularly useful in applications where the fluid flow rate does not remain constant. When operating in this manner, it is contemplated that power to the resistive heater(s) would be reduced after the initial pre-heat cycle 142. A power reduction of, for example, 50 percent is believed to be sufficient, though other power reductions may be satisfactory depending on the sensor's 10 application. The power reduction can be accomplished by modulating input to the heating resistor(s) in a well-known manner.

Figure 13:
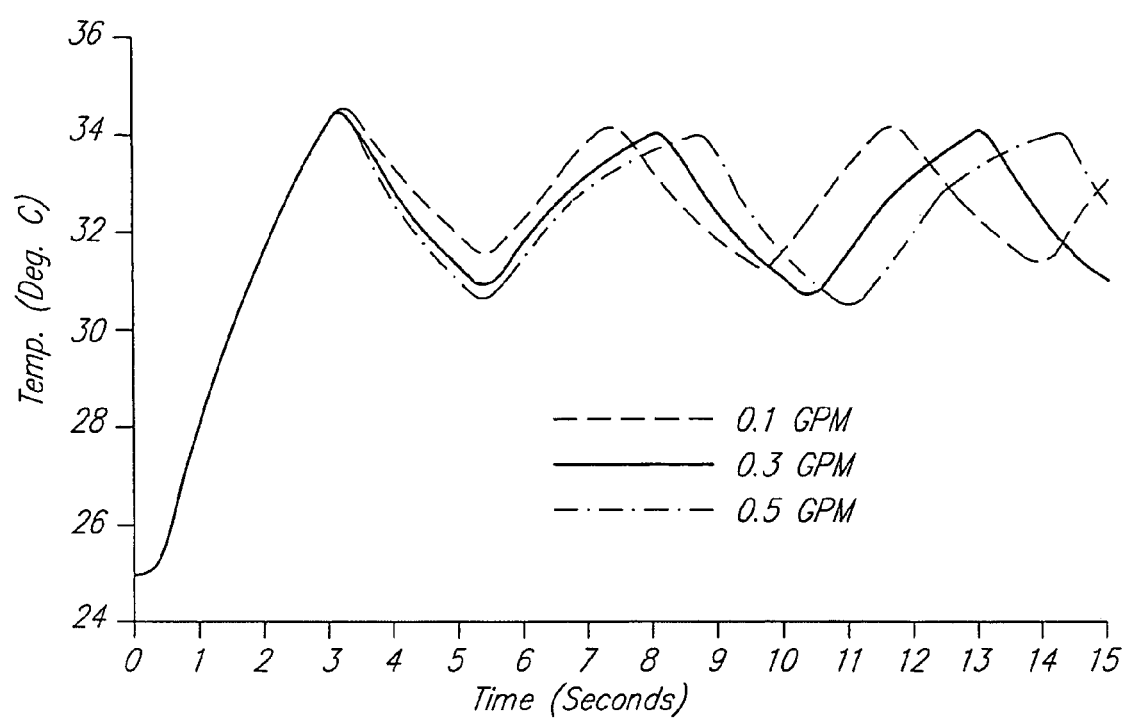
FIG. 13 is an exemplary graph plotting the temperature response over time of the fluid flow rate sensor of the invention when operating in a mode to provide a sequentially updated output.
Figure 14:
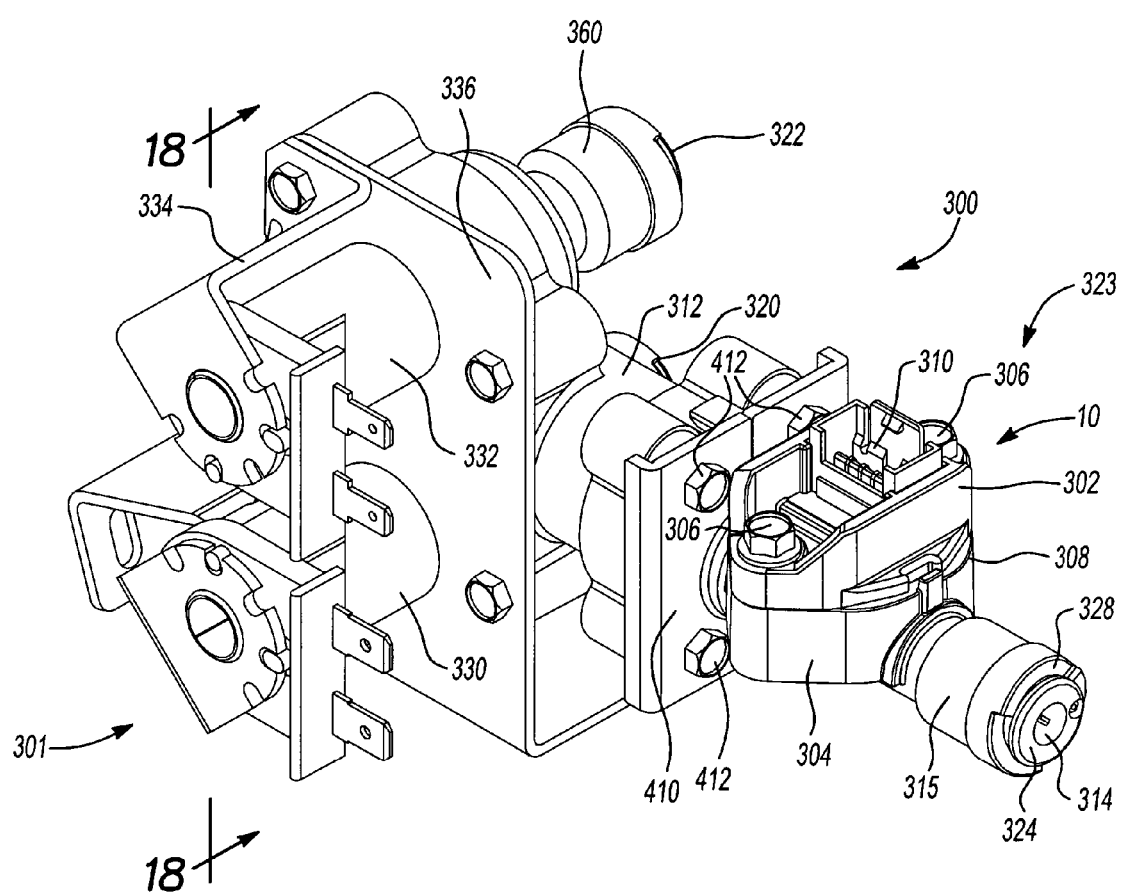
FIG. 14 is a perspective view of a valve assembly including a fluid flow rate sensor in accordance with the invention.

The sensor 10 would then continue to operate as previously described. After a first output 20 is generated at 150, the process is then repeated at 152. The heating resistor(s) are, therefore, again pre-heated at 142. The process continues and a second output 20 is generated at 150. Each successive loop of operation, therefore, provides a sequential output 20 that is indicative of the fluid flow rate, which may be changing over time. FIG. 13 is a graph illustrating the sequential pre-heating operation described above.

It is to be understood that the number and duration of the discrete time intervals referenced above may vary from the examples provided and may be dependent on the processing capabilities of the control module 14, including, for example, the control module's 14 processing speed and resolution.

As stated in the foregoing discussion, the manner in which the temperature of the thermistors' $T_{1a}$, $T_{2a}$ can be determined from the output voltage ($V_{out}$) of the detection circuit 118 is well-known.

First, the output voltage ($V_{out}$) can be correlated to the thermistors' $T_{1a}$, $T_{2a}$ resistance values ($R_{ntc}$) according to the following equation:

$$R_{ntc} = R_{fixed} * (V_{ref} - V_{out})/(V_{ref} + V_{out})$$

It is presumed for purposes of the invention that both thermistors $T_1$, $T_2$ are at the same temperature throughout the process, i.e., $T = T_1 = T_2$, and that $R_3 = R_4 = R_{fixed}$. The temperature value (T) in degrees Kelvin is calculated, then, according to the following equation:

$$T = (1/T_o + \ln(R_{ntc}/R_o)/\beta)^{-1}$$

where temperature $T_o = 298.15°$ K, $R_o$ is the thermistors' $T_{1a}$, $T_{2a}$ resistance at temperature $T_o$, and $\beta$ is an intrinsic parameter indicative of the temperature sensitivity of the thermistor.

The temperature measurements (T) are differentiated by the control module 14 to generate dT/dt, as is well-known. In the foregoing example, dT/dt is calculated as follows:

$$(T_j - T_{j-1})/(t_j - t_{j-1})$$

Although the differentiating operation has been discussed in the context of a first order derivative, it should further be understood that higher order derivatives of the temperature versus time curve may be utilized. It is believed that the use of higher order derivatives would further improve the response time of the sensor.

It should be understood that the validity of the operation of the detection circuit 118 can be evaluated theoretically using various equations and principles well known in the art. More specifically, heat transfer theory predicts that as soon as the fluid flow starts, the thermistor temperature (T) begins to drop rapidly. It can be shown that the temperature drop is exponential, namely it can be expressed as:

$$T - T_{final} = (T_{start} - T_{final}) \exp(-Kt)$$

where $T_{start}$ is the temperature of the thermistor at the beginning of the fluid flow, $T_{final}$ is the steady state temperature of the thermistor when subject fluid flow, and t is the time after the flow starts. K, a constant, represents the cooling rate by the fluid and is considered to be a measure of the sensor's sensitivity. Since the sensor is cooled convectively by the fluid flow, K is proportional to the square-root of the flow rate.

In terms of the rate of temperature change over time (dT/dt), the minimum value of dT/dt occurs soon after the initiation of fluid flow. From the preceding equation, the maximum value is shown to be proportional to K ($T_{start} - T_{final}$). The temperature drop ($T_{start} - T_{final}$) slightly increases with the fluid flow rate. If the difference between ($T_{start} - T_{final}$) is neglected, the sensitivity of the sensor increases with K, which means that the sensitivity changes roughly as the square-root of the flow rate.

Figure 8:
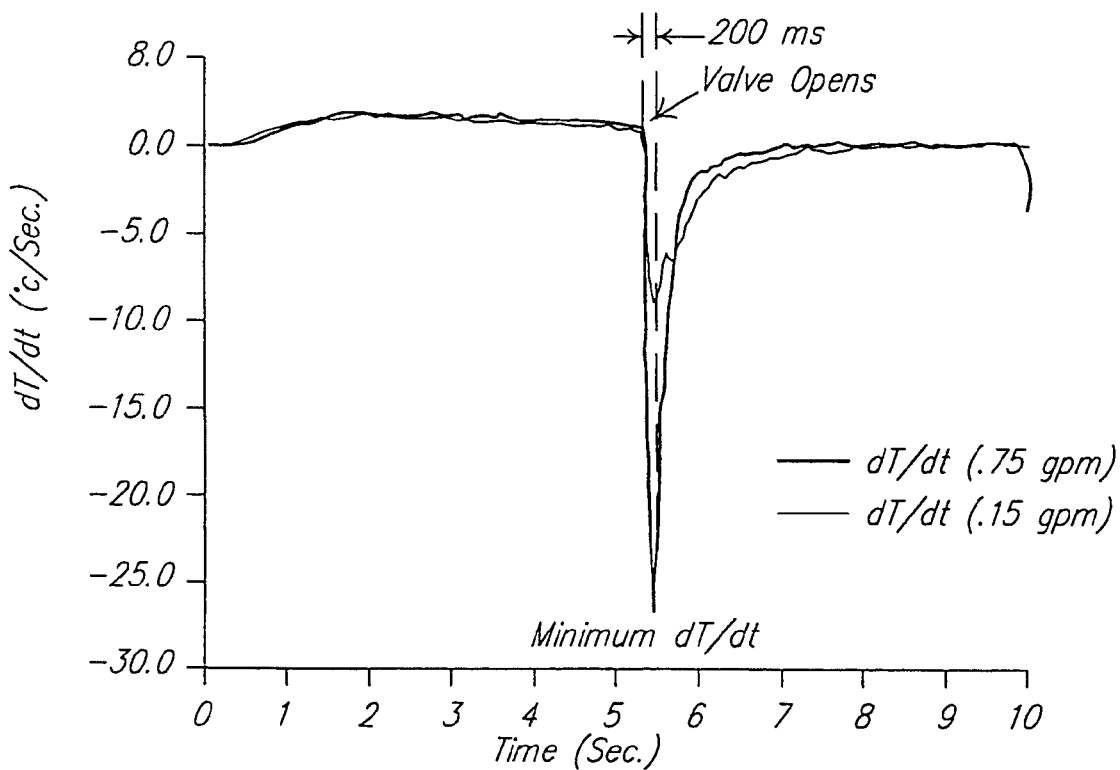
FIG. 8 is an exemplary graph plotting the rate of change of the temperature response over time for the fluid flow rate sensor of the invention.

Referring now to FIG. 8, an exemplary graph of the rate of temperature change over time of the thermistors in the detection circuit 118 of the fluid flow rate sensor 10 is shown. Calculating the numerical derivative of the temperature measurements taken by the control module 14 allows the fluid flow rate sensor 10 to reach a minimum dT/dt within a short amount of time (in this example, about 200 msec after the fluid flow begins). This time period is approximately one-tenth of the time period for the temperature (T) to reach a steady state value in a prior art device. As such, the method of operation of the invention has been shown to result in an order of magnitude improvement in the response time of fluid flow sensor 10 over the prior art. While a response time of about 200 msec is illustrated, it should be understood that the response time can vary with different types of sensors operating in different applications and under different operating conditions.

Figure 9:
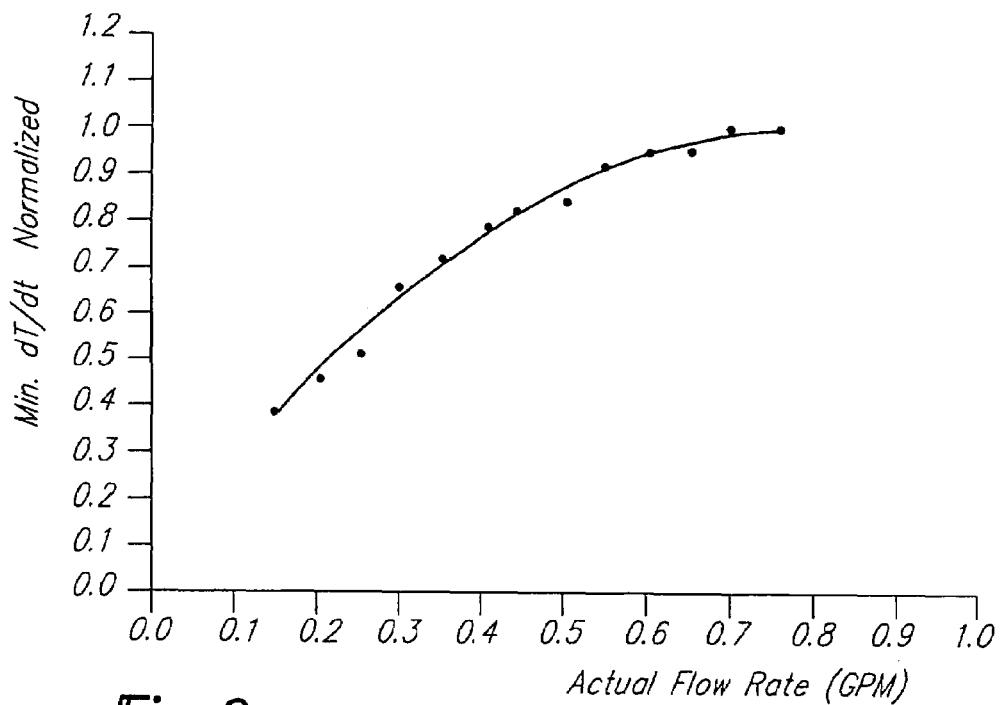
FIG. 9 is an exemplary graph correlating the normalized output of the fluid flow rate sensor of the invention with actual fluid flow rates.

The minimum dT/dt determined as part of the method of the invention can be normalized to calibrate the fluid flow rate sensor to an actual fluid flow rate in any particular sensor application. One example is shown in FIG. 9. This normalization process involves generating characteristic curves of dT/dt at various fluid flow rates. As shown in FIG. 9, the number of data points in this example is 13. Next the minimum dT/dt at each of the various flow rates is determined. The minimum dT/dt for each flow rate is then divided by the minimum dT/dt of the highest flow rate that is expected to occur in the device where the sensor 10 is to be employed. Consequently, the normalized flow rate values can be represented a scale of 0 to 1, where 1 equals the highest anticipated flow rate.

Further improvements to optimize the thermal mass of the detection module 104 comprise utilizing a highly thermally conductive ceramic substrate upon which is screen printed a ceramic-filled carbon paste material that forms the thermistors $T_1$ and $T_2$. Such material is available from Heraeus Incorporated, Circuit Materials Division under the R100 Series designation. Such a configuration completely eliminates the discrete thermistor components in the detection circuits 118 and helps to reduce the thermal mass of the detection module 104. A fluid flow rate sensor 10 of the invention constructed according to this configuration and operating as described above has demonstrated a response time in an icemaker application on the order of 0.5 to 1 second. This response time is on the order of a 50 percent or greater decrease in response time over the prior art.

Also, to improve the heat transfer characteristics and durability of the probe, it is contemplated that the housing 116 can be eliminated and a thin layer of a thermally conductive dielectric polymer or a glass material be applied directly to the detection module 104 as a glaze to encapsulate the detection module 104 and protect it from moisture and/or abrasion.

Figure 10:
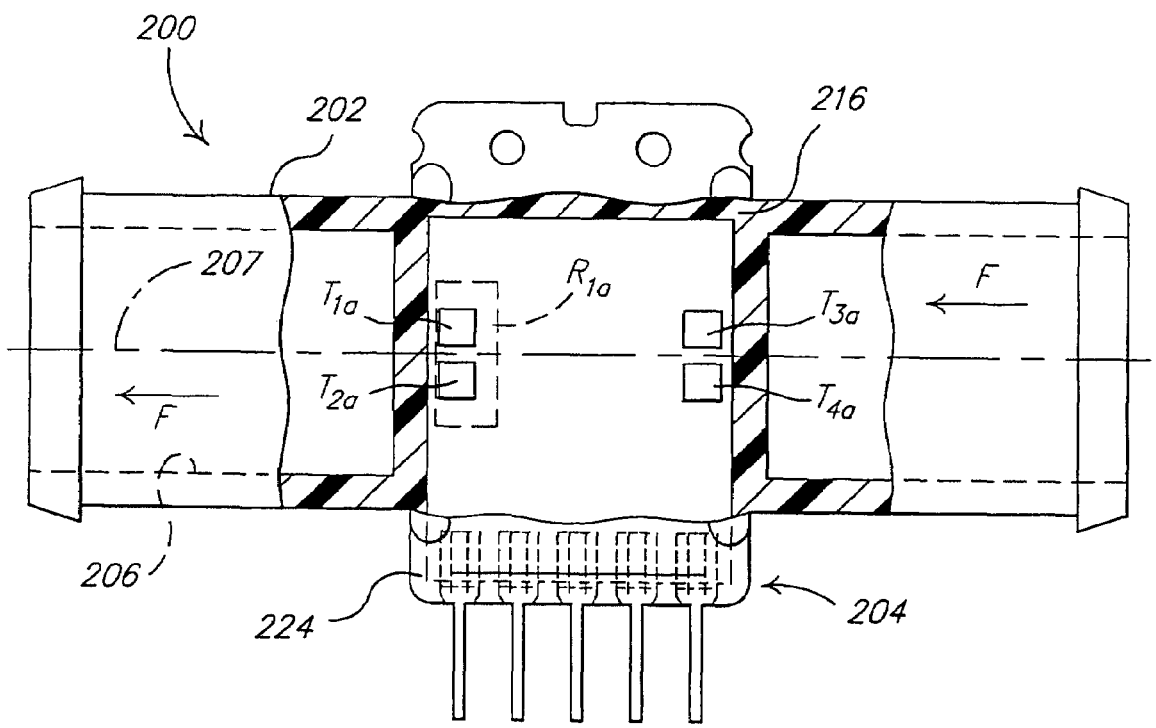
FIG. 10 is a perspective view of another embodiment of a probe for use with the fluid flow rate sensor of the invention.
Figure 11:
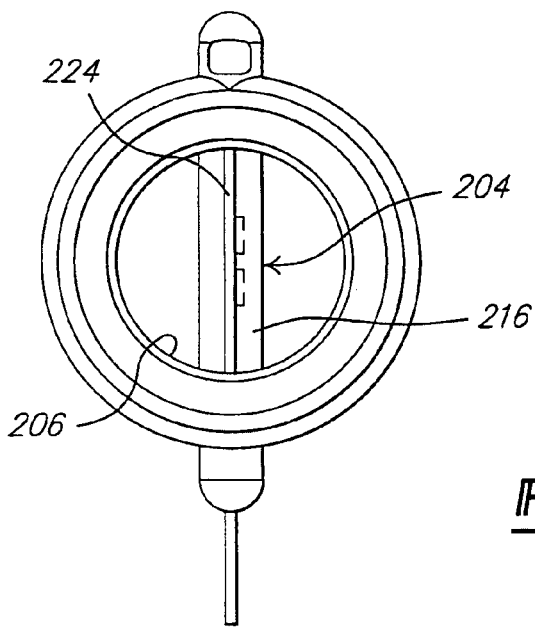
FIG. 11 is an end view of the probe of FIG. 10.
Figure 12:
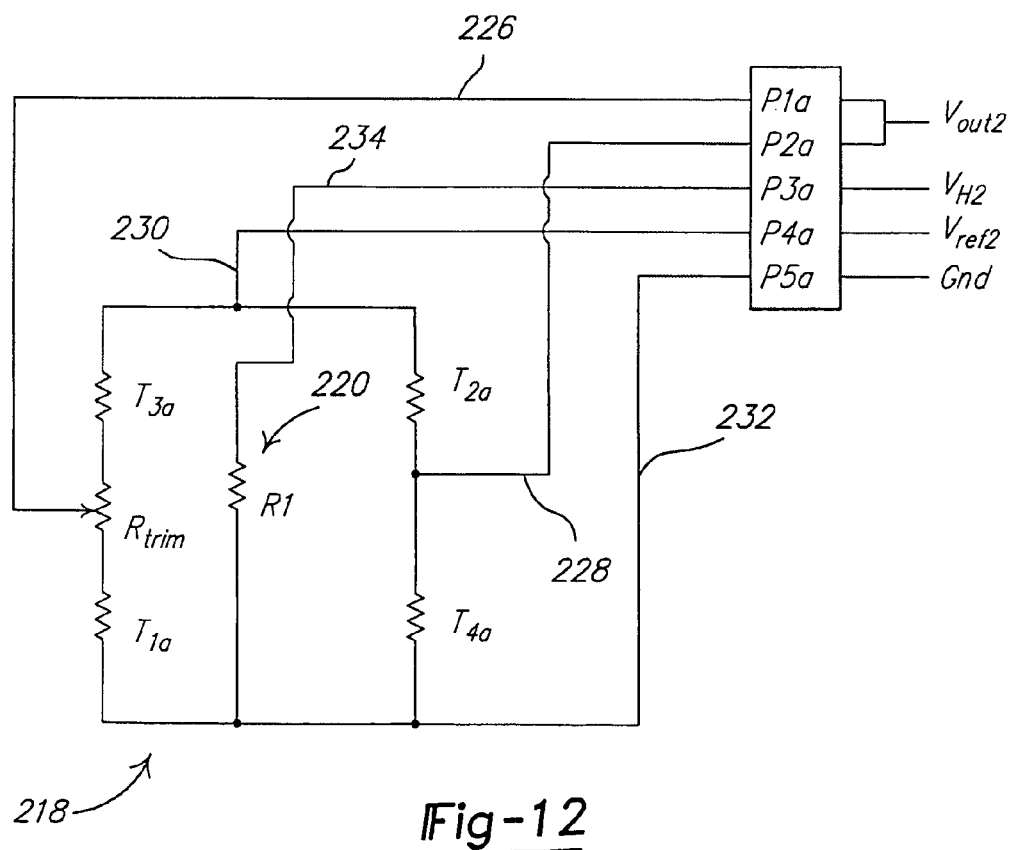
FIG. 12 is a schematic diagram of one embodiment of a detection circuit for use with the probe of FIG. 10.

Another embodiment of a probe 200 for use in the sensor 10 of the invention is shown in FIGS. 10-12. The probe 200, like the probe 100, also generally comprises a body 202 and a detection module 204. The body 202 is substantially similar to body 102, and like components are designated with like reference numerals.

Like the detection module 104 the detection module 204 comprises a detection circuit 218 and a heating circuit 220. The detection module 204, however, has a generally more rectangular configuration (as viewed in FIG. 10), with height to width ratio of about 3 to 2, where the width of the detection module 204 is measured along the longitudinal axis 207 of the probe body 202.

The detection circuit 218 comprises a plurality of NTC thermistors $T_{1a}$, $T_{2a}$, $T_{3a}$, $T_{4a}$ deposited on a ceramic substrate 224. The thermistors $T_{1a}$, $T_{2a}$, $T_{3a}$, $T_{4a}$ together form a 4-wire bridge circuit. Referring to FIG. 12, thermistor $T_{1a}$ is coupled in series with thermistor $T_{3a}$ to form one leg of the bridge and thermistor $T_{2a}$ is coupled in series with thermistor $T_{4a}$ to form the other leg of the bridge. Together, thermistor $T_{1a}$ and thermistor $T_{3a}$ are coupled in parallel with thermistor $T_{2a}$ and thermistor $T_{4a}$. An optional trim resistor $R_{trim}$ is included in series with thermistors $T_{1a}$ and $T_{3a}$ to enable the bridge circuit to be balanced, as is known in the art. The thermistors $T_{1a}$, $T_{2a}$, $T_{3a}$, $T_{4a}$ are preferably screen printed directly on a ceramic substrate 224.

Like the detection circuit 118, the detection circuit 218 includes traces 226, 228, 230, 232 that lead to a plurality of pin connectors $P_{1a}$, $P_{2a}$, $P_{4a}$, $P_{5a}$ located on the ceramic substrate 224. Trace 230 terminates at pin $P_{4a}$, where a reference voltage $V_{ref2}$ is applied to the detection circuit 218. Traces 226, 228 are respectively coupled to opposite legs of the detection circuit 218 and terminate at pins $P_{1a}$, $P_{2a}$. An output voltage $V_{out2}$, which can be calibrated to represent a temperature difference (ΔT) across the bridge and between thermistors $T_{1a}$ $T_{3a}$ and thermistors $T_{2a}$, $T_{4a}$ as is well-known in the art, can be read at pins $P_{1a}$, $P_{2a}$. Trace 232 terminates at pin $P_{5a}$ which is connected to ground.

The heating circuit 220 of the detection module 204 comprises a heating resistor $R_{1a}$. Trace 234 of the heating circuit 220 terminates at pin $P_{3a}$. A voltage $V_{H2}$ to power the heating circuit 220 is applied at pin $P_{3a}$. The heating circuit 220 is electrically insulated from the detection circuit 218, but not thermally insulated. The heating resistor $R_{1a}$ is located on the ceramic substrate proximate to thermistors $T_{1a}$, $T_{2a}$ such that heat energy from the heating resistor $R_{1a}$ is conducted to the thermistors $T_{1a}$, $T_{2a}$. Heat energy from the heating resistor $R_{1a}$ is not, however, conducted to thermistors $T_{3a}$, $T_{4a}$. The heating resistor may have a rating of as much as 4 to 6 watts.

The detection module 204 is generally received within the housing 216 such that it is perpendicular to the direction of fluid flow F through the passageway 206. Referring to FIGS. 10 and 11, the detection module's 204 ceramic substrate 224 is located within the housing 216 such that it lies within the passageway 206 of the body 202. All of the pin connectors $P_{1a}$, $P_{2a}$, $P_{3a}$, $P_{4a}$, $P_{5a}$, however, extend outward from the housing 216. The detection circuit 218 and heating circuit 220 are arranged such that the thermistors $T_{1a}$, $T_{2a}$, $T_{3a}$, $T_{4a}$ and the heating resistor $R_{1a}$ all lie on the portion of the ceramic substrate 224 that is within the passageway 206 of the body 202. Further, the arrangement of thermistors $T_{1a}$, $T_{2a}$, $T_{3a}$, $T_{4a}$ is such that the unheated thermistors $T_{3a}$, $T_{4a}$ lie upstream in the fluid from the heated thermistors $T_{1a}$, $T_{2a}$.

The use of four thermistors $T_{1a}$, $T_{2a}$, $T_{3a}$, $T_{4a}$ in the detection circuit 218 and the thermistors' $T_{1a}$, $T_{2a}$, $T_{3a}$, $T_{4a}$ physical arrangement in the passageway 206 of the body 202 provide further advantages. One significant advantage is that the output voltage $V_{out2}$ is automatically compensated for ambient temperature changes, i.e., changes in the temperature of the fluid. This is important because if significant and/or rapid changes in the fluid temperature occur, they could distort the output of the sensor 10 causing the sensor 10 to give inaccurate results.

For example, first assume that the temperature of the static fluid (i.e., before flow is initiated) is at 25° C. In this environment then, the sensor 10 begins its operation as described above with reference to FIG. 7. Then assume that the temperature of the fluid drops to 10° C. upon initiation of fluid flow. It is readily understood by those of ordinary skill that the 10° C. fluid flowing at a given rate will have a greater capacity to remove heat from the thermistors than the 25° C. fluid flowing at the same rate. In such a case, then, the uncompensated sensor would be unable to discern that the change in temperature that it measures, and the rate of change in the temperature that it determines, has resulted, at least in part, due to the reduction in the temperature of the fluid.

The output voltage $V_{out2}$ of the detection circuit 218, however, represents a temperature difference (ΔT) across the bridge and not an absolute temperature (T). This is because the unheated thermistors $T_{3a}$, $T_{4a}$ on opposite sides of the bridge of the detection circuit 218 counter-act the impact on the output voltage $V_{out2}$ caused by temperature changes in the fluid. Consequently, the compensated sensor measures the change in relative temperature and calculates the rate of change of the relative temperature.

FIGS. 14-18 show an exemplary valve assembly 300 having a valve portion 301 and integrating a probe 302 for use with the fluid flow rate sensor 10 of the invention. The probe 302 may be mounted to a body 304 of the valve assembly 300 with fasteners 306 and a sealing means 308. Pin connectors 310 can connect the probe 302 with a control module.

As will be described in great detail, the fluid flow rate sensor 10 and the probe 302 may be mounted at various locations on the valve assembly 300 such as at the inlet or outlet of the valve assembly 300.

The valve assembly 300 includes a valve body 312, a water inlet 314, a valve body inlet 315 and a pair of water outlets 320 and 322. A gasket 316 and a screen 318 (FIG. 15) may be disposed downstream of the fluid flow rate sensor 10. The screen 318 inhibits debris particles, which may be contained in the incoming residential water flow, from reaching the downstream components of the valve assembly 300. During operation of the valve assembly 300, water is selectively advanced from the water inlet 314, through the valve body 312, and out the desired water outlet 320 and/or 322. Alternatively, other water inlets may be used. For purposes of discussion, the water inlet 314 and the fluid flow rate sensor 10 are collectively referred to as the inlet assembly 323. In this way, according to the example shown, the fluid flow rate sensor 10 is integrated within the inlet assembly 323 and arranged downstream of the inlet 314 and upstream of the outlet 320, 322.

The exemplary valve assembly 300 shown in the drawings is particularly useful for supplying water to two separate appliance components such as an icemaker and a door-mounted cold water dispensing unit. It should be appreciated however, that the concepts of the present invention may also be utilized in the construction of water valve assemblies having a single outlet and/or water valve assemblies for use in other types of appliances such as dishwashers and clothes washers or even in the construction of water valve assemblies for non-appliance applications. Furthermore, while the example described herein has been directed toward a direct acting valve assembly, a pilot operated valve assembly may also be used. One such pilot valve is taught in U.S. Pat. No. 5,269,333 issued on Dec. 14, 1993 to the assignee of the present invention, namely Emerson Electric Co.

Figure 17:
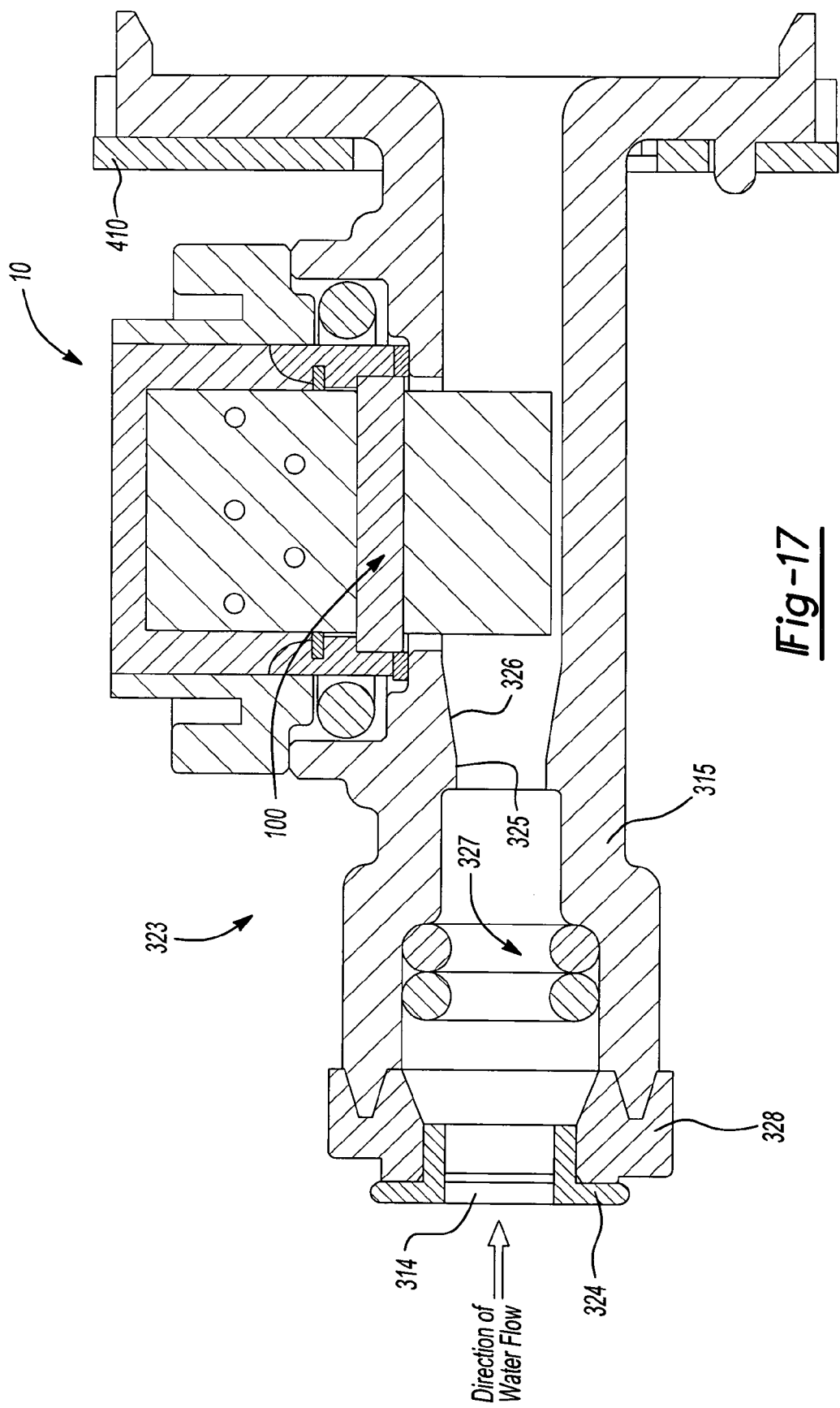
FIG. 17 is a sectional view of an inlet assembly taken along line 17-17 of FIG. 15.

The water inlet 314 is typically connected to a residential water line (not shown) or water filter outlet line thereby providing for a water flow to the valve assembly 300. The inlet 314 and the outlets 320 and 322 may include a collet 324 and a cap component 328. The collet 324 and cap component 328 may be of the quick connect variety. The quick connect inlet 314 and outlets 320 and 322 facilitate connection of an appliance water line (not shown) for delivering water to the desired appliance component. With reference to FIG. 17, the valve body inlet 315 of the inlet assembly 323 is configured to retain and seal the fluid flow rate sensor 10 and expose its sensing elements to the water as it flows past during demands for water by the control module 14 (FIG. 2). The geometry of the valve body inlet 315 upstream of the flow rate sensor 10 defines a molded shoulder 325 that acts to stop a tube (not specifically shown) from being inserted too far into the inlet assembly 323. The inside diameter bore of the shoulder 325 may be sized larger than an inside diameter of the tube. The geometry downstream of the shoulder 325 defines a diverging nozzle section 326 that is designed to provide the maximum flow area to minimize water flow velocity and prevent or minimize turbulent flow as the water moves toward and past the flow rate sensor 10. This may improve the accuracy of the fluid flow rate sensor 10 and the resultant water flow delivery. An o-ring assembly 327 may be supported in the valve body inlet 315 adjacent the cap component 328. It should be noted that two o-rings are shown but the number of o-rings or tube seals may vary.

Figure 18:
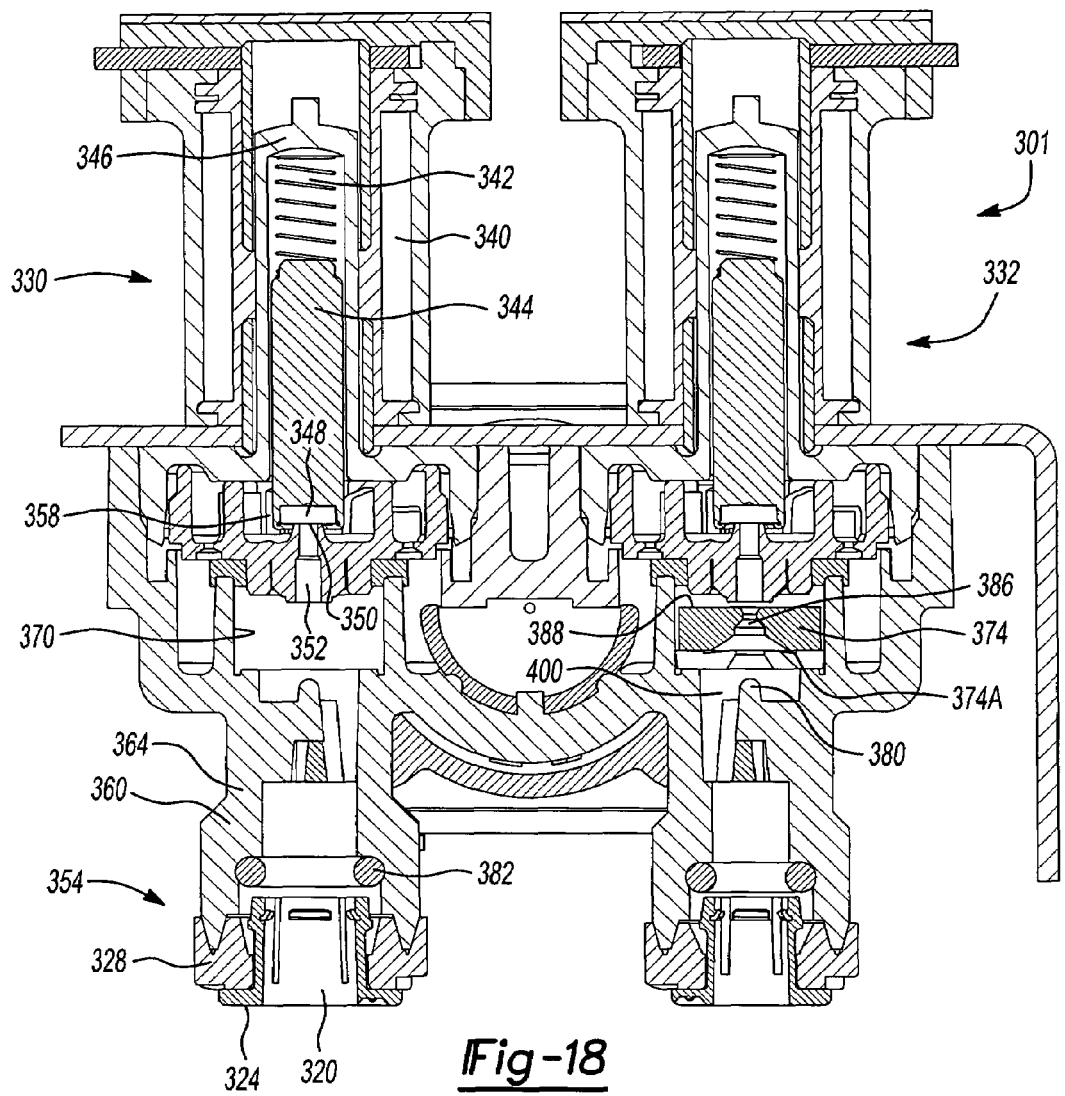
FIG. 18 is a sectional view of the valve assembly taken along line 18-18 of FIG. 14.

With specific reference now to FIG. 18, the water valve assembly 300 further includes a pair of valve actuator assemblies 330 and 332 having an upper plate frame 334 and a lower plate frame 336. For purposes of discussion, the operation and features associated with the actuator assembly 330 and outlet 320 of the valve assembly 300 will be described in greater detail. It is appreciated however, that the actuator assembly 332 and outlet 322 are similarly constructed and provide similar operation.

The valve portion 301 of the water valve assembly 300 will now be further described. The water valve assembly 300 generally includes field windings 340, a biasing spring 342, a solenoid armature 344, a guide tube 346, a valve seal 348, a valve surface 350, an outlet extension 352 and a valve body outlet assembly 354. The valve seal 348 is retained in the solenoid armature 344. The solenoid armature 344 is slideably carried in the guide tube 346 and is moveable to an open position away from the valve surface 350 for permitting water flow from an actuation chamber 358 to the valve outlet 320 and moveable to a closed position contacting the valve surface 350 for preventing water flow from the actuation chamber 358 to the valve outlet 320.

When the field windings 340 are energized, the solenoid armature 344 is retracted to lift the valve seal 348 thereby permitting flow of water from the actuation chamber 358 into the valve body outlet assembly 354, out the outlet 320 and into the water line of the appliance (not shown). When the field windings 340 are de-energized, the solenoid armature 344 is returned to the closed position by the biasing spring 342 and the valve seal 348 contacts the valve surface 350 thereby stopping the flow of water from the actuation chamber 358 into the valve body outlet assembly 354.

With continued reference to FIGS. 14-18, the valve body outlet assembly 354 will now be described in greater detail. The valve body outlet assembly 354 generally includes a valve body outlet 360, a flow seat component 364, the cap component 328 and the collet 324.

The flow seat component 364 defines a flow control chamber 370 for accepting water from the outlet extension 352. The flow control chamber 370 is disposed within the valve body outlet 360 and retains a flow control member 374, a support washer 374A and a noise reduction member or bullet 380. The bullet 380 can be integral with the flow seat component 364 as illustrated in FIG. 18 or can be a separate piece. An o-ring 382 is supported adjacent the cap component 328 and is adapted to seat on the flow seat component 364.

The flow control member 374 may be made of flexible material such as ethylene propylene (EP) rubber, and has a central passage 386 defined therein. The flow control member 374 flexes or deforms in response to variations in inlet water pressure exerted on an upstream surface 388. In particular, a higher inlet water pressure on the upstream surface 388 causes a greater amount of flexing or deformity of the flow control member 374, thereby reducing the diameter of the central passage 386. A lower inlet water pressure exerted on the upstream surface 388, causes the flexing or deformity of the flow control member 374 to be reduced, thereby increasing the diameter of the central passage 386.

The flow seat component 364 provides a surface on which the support washer 374A and flow control member 374 are supported. The bullet 380 reduces the amount of cavitation, and hence the amount of noise, generated by the flow of water being advanced through the valve assembly 300. The bullet 380, may be made of a plastic material such as polypropylene. The bullet 380 is centrally aligned in a central passage 400 of the flow seat component 364. Since the bullet 380 is aligned with the central passage 400, a direct flow path or line of advancement of the flow of water exists.

Figure 15:
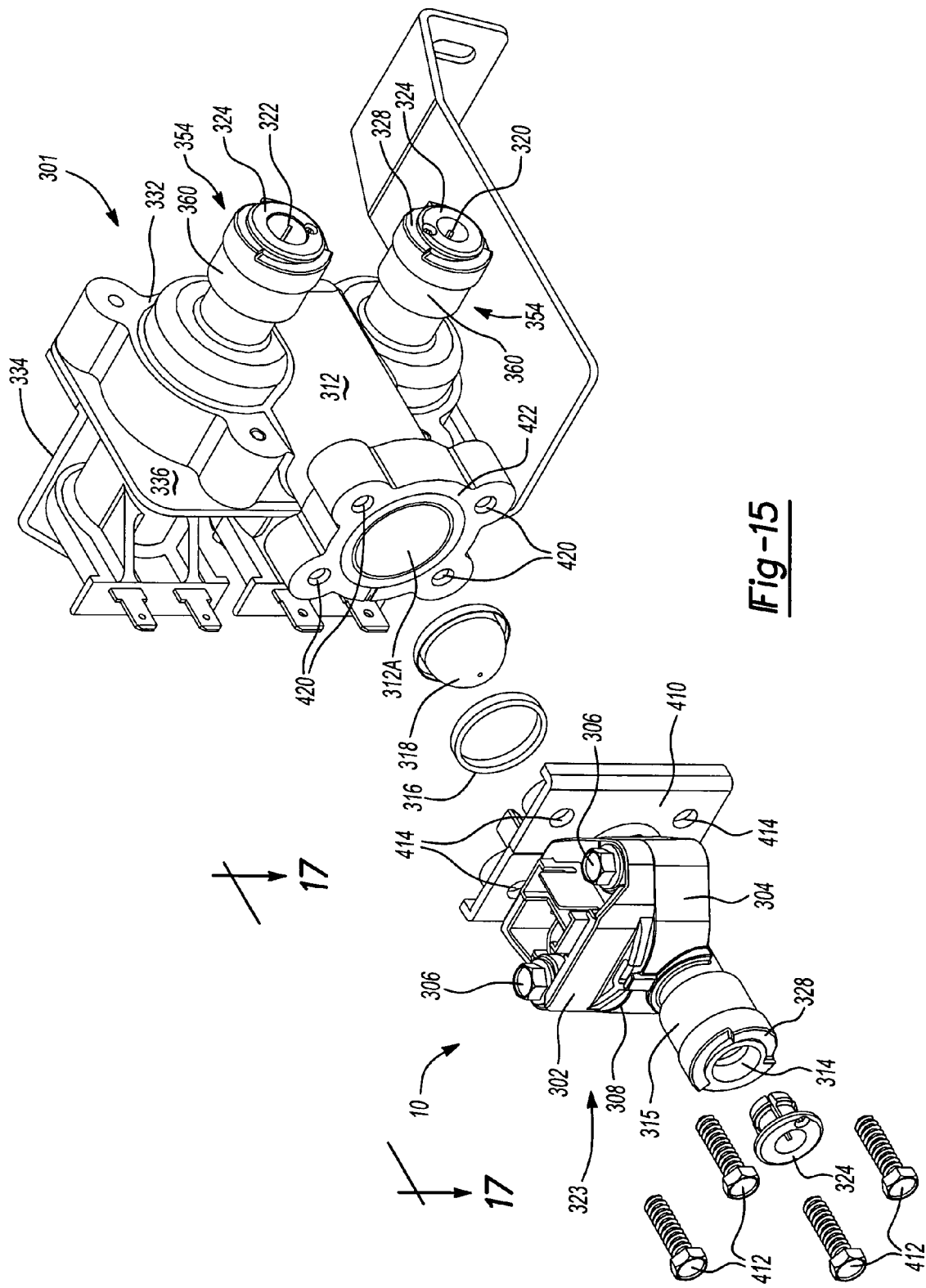
FIG. 15 is an exploded view of the valve assembly of FIG. 14.
Figure 16:
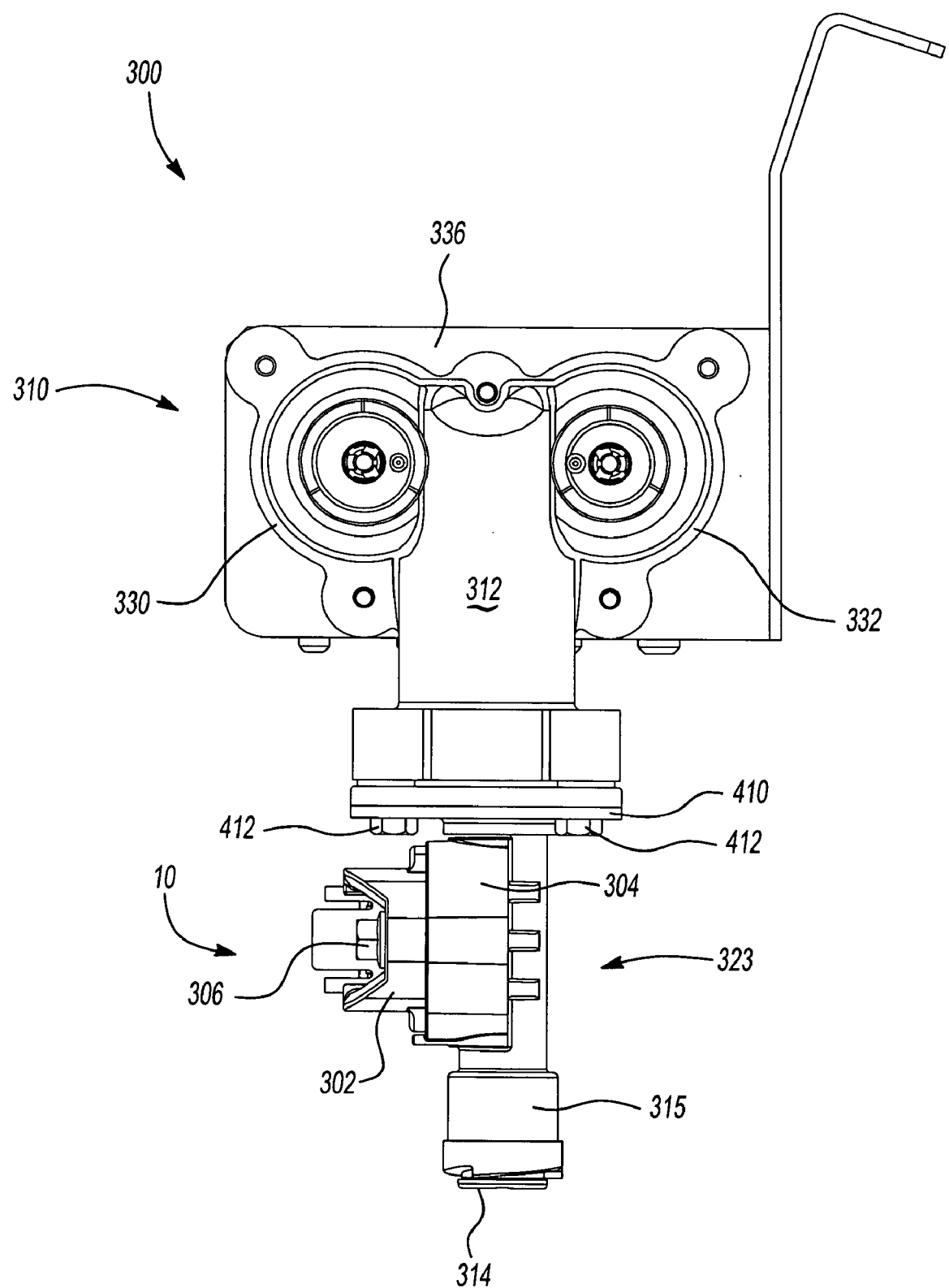
FIG. 16 is a bottom view of the valve assembly of FIG. 14.

Returning now to FIGS. 14 and 15 and with additional reference to FIG. 19, exemplary mounting configurations will be described. In the example illustrated in FIGS. 14 and 15, the flow rate sensor 10 is shown having a probe 302 mounted to a body 304. The body 304 may be secured to a mounting plate 410 and further secured to the valve body 312 by way of fasteners 412. The fasteners 412 may locate through respective apertures 414 defined through the mounting plate 410 and complementary bores 420 formed in a mounting portion 422 of the valve body 312 (FIG. 15). The mounting configuration is merely exemplary and other arrangements are contemplated.

As explained above, while the flow rate sensor 10 is shown integrated within the inlet assembly 323, the position of the flow rate sensor 10 relative to the valve body 312, inlet 314, and outlets 320 and 322 is merely exemplary. As a result, the geometry to retain and seal the flow rate sensor 10 may be incorporated into any of these areas. The example shown in FIGS. 14-18, provides water flow control using one flow sensor 10 to two unique outputs, such as an icemaker and water dispenser. In other examples, such as single use or single outlet applications (such as a dishwasher or refrigerators equipped with only an icemaker), the location of the flow rate sensor 10 may be either at the inlet or the outlet. An advantage for locating the flow rate sensor 10 in the outlet, is that it would not be continuously exposed to household water pressure. Exposure to household pressure would only occur during times that the valve is open and flowing water. In another example, such as a laundry washing machine where dual inlet, single outlet valves are used, a preferred location of the flow rate sensor may be the outlet. In this way, such a configuration may provide for independent control of cold, hot or mixed temperature water using one flow rate sensor 10. For applications with the sensor located in the inlet of the body, the nozzle segment may be incorporated in an added part that is inserted and retained in the inlet area of the body. For applications wherein the flow rate sensor 10 is located in the outlet, the nozzle segment may be molded into this area as with the inlet assembly 323 shown in FIGS. 14-18. Further, an advantage for applications where the flow rate sensor is located in the inlet or outlet within the body is it provides for an overall reduction in the length of the inlet segment of the valve assembly. This may be important for applications where available space is limited.

Figure 19:
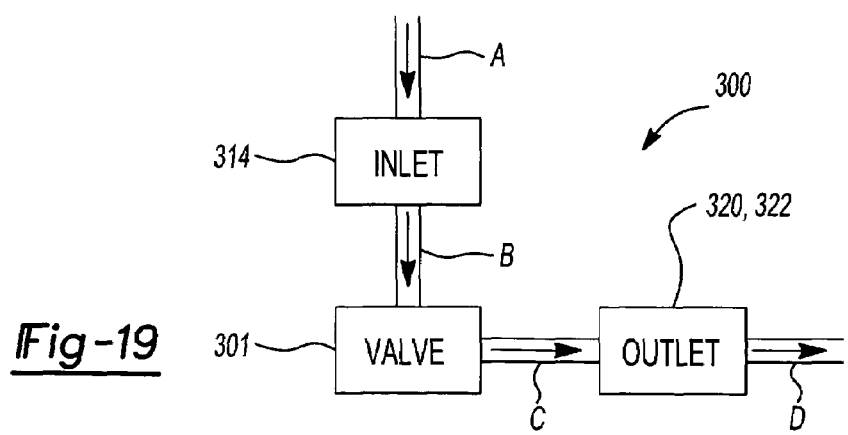
FIG. 19 is block diagram illustrating exemplary locations of the fluid flow rate sensor with respect to the valve assembly.

With reference to FIG. 19, a block diagram illustrating the valve assembly 300 is shown. As discussed in the examples above, it is contemplated that the flow rate sensor 10 may be operatively located in a variety of locations. Specifically, the flow rate sensor 10 may be fluidly connected at position A, upstream of the inlet 314. Alternatively, the flow rate sensor 10 may be fluidly connected at position B, downstream of the inlet 314 and upstream of the valve 301. In another example, the flow rate sensor 10 may be fluidly connected at position C, downstream of the valve 301 and upstream of the outlet 320, 322. In addition, the flow rate sensor 10 may be fluidly connected at position D, downstream of the outlet 320, 322. In other examples, it is contemplated that the flow rate sensor 10 may be integrally formed with the inlet 312A of valve body 312, the valve 301 and/or either or both of the outlets 320, 322.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A fluid valve assembly, comprising:
 a valve body defining an inlet, an outlet and a valving cavity disposed between and communicating with the inlet and the outlet, and a valving surface between the inlet and the outlet;
 a valve moveable to a position away from the valving surface for permitting flow from the inlet through the valving cavity to the outlet, and moveable to a position contacting the valving surface for preventing flow from the inlet through the valving cavity;
 a fluid flow rate sensor disposed between the inlet and the outlet and having a probe including a detection module adapted to change condition in response to the presence of the flow of fluid;
 a control module electrically connected to the probe, the control module monitoring the condition of the detection module over time, determining a rate of change of the condition over time, and generating an output that is indicative of the rate of flow of the fluid;
 an I/O module connected to the control module and communicating the output of the control module to another device;
 a detection circuit comprising a plurality of thermistors and a plurality of resistors, the detection circuit adapted to provide a voltage that varies in response to a change in temperature of the thermistors; and
 a heating circuit comprising at least one resistor in thermal communication with at least one thermistor.

2. The fluid valve assembly of claim 1, wherein the condition monitored by the control module is the output voltage of the detection circuit, and the control modules determines the temperature of the thermistors from the output voltage.

3. The fluid valve assembly of claim 2, wherein the control module determines the rate of change of the temperature of the thermistors over time.

4. The fluid valve assembly of claim 1, wherein the detection module is encapsulated by a thermally-conductive polymer.

5. The fluid valve assembly of claim 1, wherein the control module determines the $n^{th}$ order derivative of the temperature of the thermistors over time, where $n \geq 1$.

6. A fluid valve assembly, comprising:
 a valve body defining an inlet, an outlet and a valving cavity disposed between and communicating with the inlet and the outlet, and a valving surface between the inlet and the outlet;
 a valve moveable to a position away from the valving surface for permitting flow from the inlet through the valving cavity to the outlet, and moveable to a position contacting the valving surface for preventing flow from the inlet through the valving cavity;
 a fluid flow rate sensor disposed between the inlet and the outlet and having a probe including a detection module adapted to change condition in response to the presence of the flow of fluid;
 a detection circuit comprising a plurality of thermistors and a plurality of resistors, the detection circuit adapted to provide a voltage that varies in response to a change in temperature of the thermistors;
 a heating circuit comprising at least one resistor in thermal communication with at least one thermistor; and
 a control module electrically connected to the detection circuit, the control module monitoring the condition of the detection module over time, determining a rate of change of the condition over time, and generating an output that is indicative of the rate of flow of the fluid.

7. The fluid valve assembly of claim 6, wherein the condition monitored by the control module is the output voltage of the detection circuit, and the control modules determines the temperature of the thermistors from the output voltage.

8. The fluid valve assembly of claim 7, wherein the control module determines the rate of change of the temperature of the thermistors over time.

9. The fluid valve assembly of claim 6, wherein the detection module is encapsulated by a thermally-conductive polymer.

10. The fluid valve assembly of claim 6, wherein the control module determines the $n^{th}$ order derivative of the temperature of the thermistors over time, where $n \geq 1$.

11. A fluid valve assembly, comprising:
 a valve body defining an inlet, an outlet and a valving cavity disposed between and communicating with the inlet and the outlet, and a valving surface between the inlet and the outlet;
 a valve moveable to a position away from the valving surface for permitting flow from the inlet through the valving cavity to the outlet, and moveable to a position contacting the valving surface for preventing flow from the inlet through the valving cavity; and a fluid flow rate sensor disposed between the inlet and the outlet and having a probe including a detection module adapted to change condition in response to the presence of the flow of fluid;

wherein the probe includes a body having a tubular member having a longitudinal axis and a passageway extending through the tubular member in the direction of the longitudinal axis, the body further comprising a thermally conductive polymeric housing disposed within the passageway, the housing having a detection module at least partially received therein and comprising a detection circuit and a heating circuit, the detection module comprising a plurality of thermistors and a plurality of resistors, the detection circuit adapted to provide a voltage that varies in response to a change in temperature of the plurality of thermistors and the heating circuit comprising at least one resistor in thermal communication with at least one thermistor of the plurality of thermistors.

12. The fluid valve assembly of claim 11 wherein the detection module includes a heating circuit, the heating circuit comprising at least one resistor in thermal communication with at least one thermistor of the plurality of thermistors.

13. The fluid valve assembly of claim 12 wherein the detection module further comprises a ceramic substrate and wherein the detection circuit and the heating circuit are deposited on the ceramic substrate.

14. The fluid valve assembly of claim 13 wherein the detection circuit comprises a ceramic-filled carbon paste that is screen printed on the ceramic substrate to form the plurality of thermistors.

15. The fluid valve assembly of claim 11 wherein the detection circuit is encapsulated by a thermally-conductive polymer.

16. The fluid valve assembly of claim 11 wherein at least one thermistor of the detection module lies within the passageway.

* * * * *